(12) United States Patent
Chao et al.

(10) Patent No.: US 10,346,667 B2
(45) Date of Patent: Jul. 9, 2019

(54) CAPACITANCE DETERMINING CIRCUIT AND FINGERPRINT RECOGNITION SYSTEM

(71) Applicant: Shenzhen Goodix Technology Co., Ltd., Shenzhen, Guangdong (CN)

(72) Inventors: Kuo-hao Chao, Guangdong (CN); Meng-Ta Yang, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 138 days.

(21) Appl. No.: 15/705,265

(22) Filed: Sep. 15, 2017

(65) Prior Publication Data

US 2018/0060637 A1    Mar. 1, 2018

Related U.S. Application Data

(63) Continuation of application No. PCT/CN2016/096587, filed on Aug. 24, 2016.

(51) Int. Cl.
*G06K 9/00* (2006.01)
*G06F 3/041* (2006.01)
*G06F 3/044* (2006.01)

(52) U.S. Cl.
CPC .......... *G06K 9/0002* (2013.01); *G06F 3/044* (2013.01); *G06F 3/0416* (2013.01); *G06F 2203/04107* (2013.01)

(58) Field of Classification Search
CPC ..... G06K 9/0002; G06F 3/0416; G06F 3/044; G06F 2203/04107
See application file for complete search history.

(56) References Cited

U.S. PATENT DOCUMENTS

2015/0233989 A1* 8/2015 Chou ................. G01R 27/2605
345/174
2015/0355765 A1   12/2015 Fukushima
(Continued)

FOREIGN PATENT DOCUMENTS

CN    105278782 A    1/2016
CN    205121586 U    3/2016
(Continued)

*Primary Examiner* — John B Strege
(74) *Attorney, Agent, or Firm* — Winston Hsu (57) ABSTRACT

The present invention provides a capacitance determining circuit comprising a touched layer configured to receive a touch from a finger; a shielding layer disposed under the touched layer, wherein a parasitic capacitance is formed between the shielding layer and the touched layer; a driving circuit coupled to the touched layer and the shielding layer, configured to provide a first voltage to the touched layer and the shielding layer at a first time; a sensing circuit electrically connected to the touched layer, configured to sense the touch capacitance at a second time; and a first switch with a terminal electrically connected to the shielding layer and another terminal electrically connected to the driving circuit or the touched layer. The capacitance determining circuit and the fingerprint recognition system provided by the present invention is capable of eliminating parasitic capacitance effect and enhancing accuracy and performance of capacitance sensing and fingerprint recognition.

9 Claims, 8 Drawing Sheets

(56) References Cited

U.S. PATENT DOCUMENTS

| | | | |
|---|---|---|---|
| 2016/0188949 A1* | 6/2016 | Yang | G06K 9/0002 |
| | | | 382/124 |
| 2016/0196463 A1* | 7/2016 | Jiang | G06F 3/044 |
| | | | 348/77 |
| 2017/0017828 A1* | 1/2017 | Bernstein | G06K 9/00053 |
| 2017/0061187 A1* | 3/2017 | Wen | G06K 9/0002 |
| 2017/0308218 A1* | 10/2017 | Ding | G06F 3/044 |
| 2018/0025203 A1* | 1/2018 | Lee | G06F 3/0418 |
| | | | 382/124 |
| 2018/0300521 A1* | 10/2018 | Kim | G06K 9/0002 |

FOREIGN PATENT DOCUMENTS

| | | |
|---|---|---|
| CN | 105740756 A | 7/2016 |
| JP | 2015-230599 A | 12/2015 |
| TW | M516193 | 1/2016 |

\* cited by examiner

CAPACITANCE DETERMINING CIRCUIT AND FINGERPRINT RECOGNITION SYSTEM

CROSS REFERENCE TO RELATED APPLICATIONS

The present application is a continuation of international application No. PCT/CN2016/096587, filed on Aug. 24, 2016, of which are incorporated herein by reference in its entirety.

FIELD OF THE INVENTION

The present invention relates to a capacitance determining circuit and a fingerprint recognition system, and more particularly, to a capacitance determining circuit and a fingerprint recognition system capable of reducing parasitic capacitance effect.

BACKGROUND

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

In the prior art, capacitive fingerprint recognition system is a popular fingerprint recognition technique, which uses a touch layer to receive a finger touch from a user, and senses a capacitance variation of the touch layer to determine whether it is a finger ridge or a finger valley of a fingerprint of the user. To prevent the touch layer from being interfered by other circuitry, in the prior art, a shielding layer is usually laid under the touch layer in IC layout, forming a shielding effect to prevent interference from the circuitry under the shielding layer. However, a parasitic capacitance is formed between the touch layer and the shielding layer. A capacitance of the parasitic capacitance is usually larger than a capacitance of a touch capacitance caused by touch, which has an impact on the capacitance determining circuit or the capacitance fingerprint recognition system determining the touch capacitance, such that accuracy of the fingerprint recognition system degrades.

SUMMARY

It is therefore a primary objective of the present invention to provide a capacitance determining circuit and a fingerprint recognition system capable of reducing parasitic capacitance effect.

To solve the technical problem stated in the above, the present invention provides a capacitance determining circuit comprising a touched layer configured to receive a touch from a finger; a shielding layer disposed under the touched layer, wherein a parasitic capacitance is formed between the shielding layer and the touched layer; a driving circuit coupled to the touched layer and the shielding layer, configured to provide a first voltage to the touched layer and the shielding layer at a first time; a sensing circuit electrically connected to the touched layer, configured to sense the touch capacitance at a second time; and a first switch with a terminal electrically connected to the shielding layer and another terminal electrically connected to the driving circuit or the touched layer. The capacitance determining circuit and the fingerprint recognition system provided by the present invention is capable of eliminating parasitic capacitance effect and enhancing accuracy and performance of capacitance sensing and fingerprint recognition.

Preferably, the second terminal of the first switch is electrically connected to the driving circuit.

Preferably, the first switch cuts off a connection between the driving circuit and the shielding layer at the second time.

Preferably, the driving circuit comprises a driving switch, configured to control the touched layer to receive the first voltage; wherein the driving switch is conducted at the first time.

Preferably, the second terminal of the first switch is electrically connected to the touched layer.

Preferably, the first switch conducts a connection between the touched layer and the shielding layer at the second time.

Preferably, the driving circuit comprises two driving switches, configured to control the touched layer and the shielding layer, respectively, to receive the first voltage; wherein the two driving switches are conducted at the first time.

Preferably, the sensing circuit comprises an amplifier; and an integrating capacitor, coupled to an input terminal and an output terminal of the amplifier.

To solve the technical problem stated in the above, the present invention further provides a fingerprint recognition system, comprising a sensing circuit; a plurality of pixel circuits, coupled to the sensing circuit, each pixel circuit comprising a touched layer, configured to receive a touch from a finger, wherein a touch capacitance is formed between the touched layer and the finger forms; a shielding layer, disposed under the touched layer, wherein a parasitic capacitance is formed between the shielding layer and the touched layer; a driving circuit, electrically connected to the touched layer and the shielding layer, configured to provide a first voltage to the touched layer and the shielding layer at a first time; and a first switch comprising a first terminal, electrically connected to the shielding layer; and a second terminal, electrically connected to the driving circuit or the touched layer; wherein the sensing circuit senses the touch capacitance of the plurality of pixel circuits at a second time.

To solve the technical problem stated in the above, the present invention further provides a parasitic capacitance cancelling method comprising providing the first voltage to the touched layer and the shielding layer at the first time; and making the shielding layer floating at the second time.

Preferably, the step of making the shielding layer floating at the second time comprises cutting off the first switch at the second time.

Preferably, the sensing circuit senses the touch capacitance at the second time, to generate an output voltage.

To solve the technical problem stated in the above, the present invention further provides a parasitic capacitance cancelling method comprising providing the first voltage to the touched layer and the shielding layer at the first time; and connecting the touched layer with the shielding layer via the first switch at the second time.

Preferably, the step of connecting the touched layer with the shielding layer via the first switch at the second time comprises conducting the first switch at the second time.

Preferably, the sensing circuit senses the touch capacitance at the second time, to generate an output voltage.

The capacitance determining circuit and the fingerprint recognition system of the present invention utilizes the switch connected between the shielding layer and the driving circuit to make the shielding layer floating in the sensing phase, or utilizes the switch connected between the shielding layer and the touched layer to make the shielding layer and the touched layer having the same voltage in the sensing phase, so as to eliminate the effect of the parasitic capacitance, such that the accuracy and performance of capacitance sensing and fingerprint recognition is enhanced.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
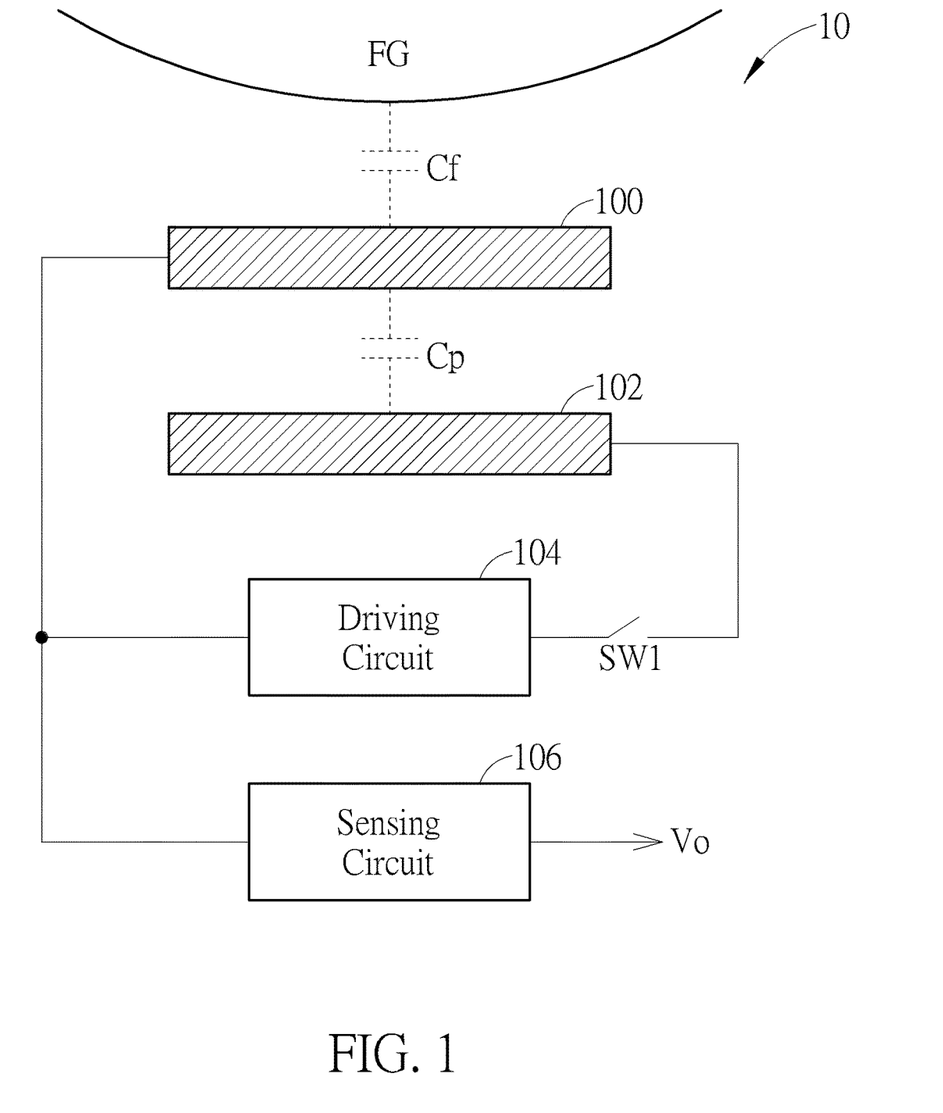
FIG. 1 is a schematic diagram of a capacitance determining circuit according to an embodiment of the present invention.

Please refer to FIG. 1, which is a schematic diagram of a capacitance determining circuit 10 according to an embodiment of the present invention. The capacitance determining circuit 10 may be applied in a fingerprint recognition system, configured to determine a capacitance of a touch capacitance. The capacitance determining circuit 10 comprises a touched layer 100, a shielding layer 102, a driving circuit 104, a sensing circuit 106 and a switch SW1 (corresponding to the first switch recited in the claims). The touched layer 100, which may be a top metal layer within integrate circuit (IC) layout, is configured to receive a touch from a finger FG. A touch capacitance Cf is formed between the touched layer 100 and the finger FG. The shielding layer 102, which may be another metal layer within IC layout, is laid just under the touched layer 100, and forms a parasitic capacitance Cp with the touched layer 100. The shielding layer 102 is configured to shield circuitry under the shielding layer 102, to prevent the touched layer 100 from interference caused by the circuitry under the shielding layer 102. The driving circuit 104 and the sensing circuit 106 are both electrically connected to the touched layer 100. In a driving phase (corresponding to the first time recited in claims), the driving circuit 104 provides a first voltage V1 to the touched layer 100 and the shielding layer 102, so as to charge the touch capacitance Cf and the parasitic capacitance Cp (i.e., to store electronic charges therein), regarded as driving the touched layer 100 and the shielding layer 102 to the first voltage V1. The first voltage V1 may be a constant voltage or a positive voltage $V_{DD}$. In a sensing phase (corresponding to the second time recited in claims), the sensing circuit 106 performs capacitance sensing on the touch capacitance Cf, to generate an output voltage Vo. The capacitance determining circuit 10 may deliver the output voltage Vo to a backend circuit (not illustrated in FIG. 1), to determine whether the location of the capacitance determining circuit 10 corresponds to a finger ridge or a finger valley of the finger FG.

To reduce/eliminate the effect on determining capacitance of the touch capacitance Cf brought by the parasitic capacitance Cp, a terminal of the switch SW1 is electrically connected to the shielding layer 102, and another terminal is electrically connected to the driving circuit 104. In the driving phase, the switch SW1 conducts a connection between the driving circuit 104 and the shielding layer 102. At this time, the driving circuit 104 provides the first voltage V1 to the touched layer 100 and the shielding layer 102. That is, the driving circuit 104 drives the touched layer 100 and the shielding layer 102 to the first voltage V1 simultaneously. In addition, in the sensing phase, the switch SW1 cuts off the connection between the driving circuit 104 and the shielding layer 102, such that the shielding layer 102 is floating (i.e., in a floating status). Notably, in the sensing phase, due to the shielding layer 102 being floating, the parasitic capacitance Cp would not have impact on the circuit loop of the sensing circuit 106, and thereby noise is reduced and accuracy of capacitance sensing and fingerprint recognition is enhanced.

Figure 2:
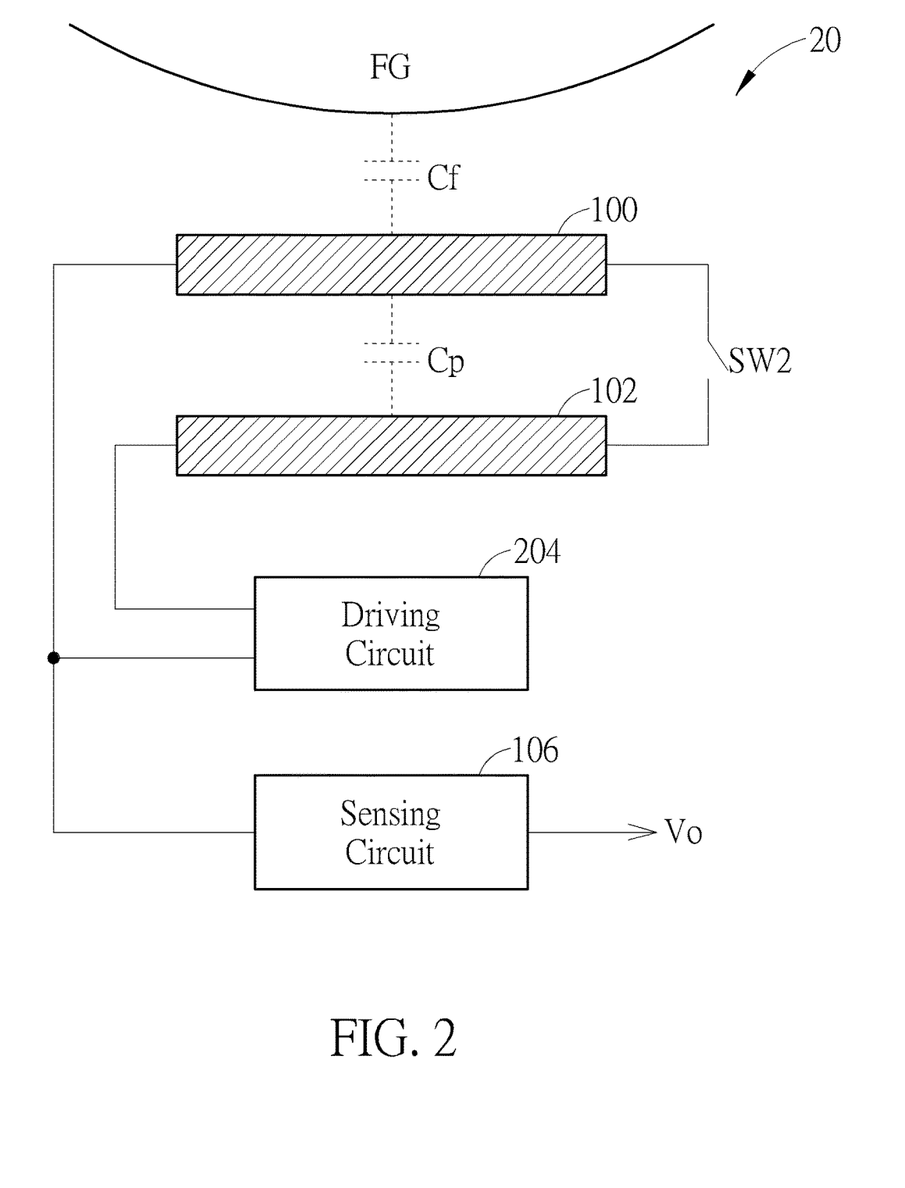
FIG. 2 is a schematic diagram of a capacitance determining circuit according to an embodiment of the present invention.

Please refer to FIG. 2, which is a schematic diagram of a capacitance determining circuit 20 according to an embodiment of the present invention. The capacitance determining circuit 20 is similar to the capacitance determining circuit 10, and thus, the same components are denoted by the same notations. Different from the capacitance determining circuit 10, the capacitance determining circuit 20 comprises a driving circuit 204 and a switch SW2 (corresponding to the first switch recited in the claims). The switch SW2 is electrically connected between the touched layer 100 and the shielding layer 102 (i.e., a terminal of the switch SW2 is electrically connected to the shielding layer 102, and another terminal is electrically connected to the touched layer 100). An output terminal of the driving circuit 204 is electrically connected to the touched layer 100, and another terminal is electrically connected to the shielding layer 102. In the driving phase, the driving circuit 204 provides the first voltage V1 to the touched layer 100 and the shielding layer 102 simultaneously, i.e., the driving circuit 204 drives the touched layer 100 and the shielding layer 102 to the first voltage V1 simultaneously. In addition, in the sensing phase, the switch SW2 conducts a connection between the touched layer 100 and the shielding layer 102, such that the touched layer 100 and the shielding layer 102 would have the same voltage. At this time, electronic charges in the parasitic capacitance Cp would be cleared out. In the sensing phase, since the touched layer 100 and the shielding layer 102 have the same voltage, the parasitic capacitance Cp is equal to 0. Thus, the parasitic capacitance Cp would not have impact on the circuit loop of the sensing circuit 106, and thereby noise is reduced and accuracy of capacitance sensing and fingerprint recognition is enhanced.

In the prior art, the shielding layer is usually connected to ground or electrically connected to a constant voltage, the parasitic capacitance formed between the shielding layer and the touched layer would have impact on the sensing circuit determining the touch capacitance, and the accuracy of fingerprint recognition is reduced. In comparison, the present invention utilizes the switch SW1 to make the shielding layer 102 floating in the sensing phase, or utilizes the switch SW2 to make the shielding layer 102 and the touched layer 100 having the same voltage in the sensing phase, so as to eliminate the effect on the sensing circuit in the sensing phase caused by the parasitic capacitance Cp, such that the accuracy of capacitance sensing and fingerprint recognition is enhanced.

In addition, FIG. 1 and FIG. 2 illustrate embodiments of single capacitance determining circuit, which is configured to sense the touch capacitance Cf of a particular location. Hence, if a plurality of capacitance determining circuits is arranged properly and integrated, it can be used to further determine the finger ridge or the finger valley of the finger FG.

Figure 3:
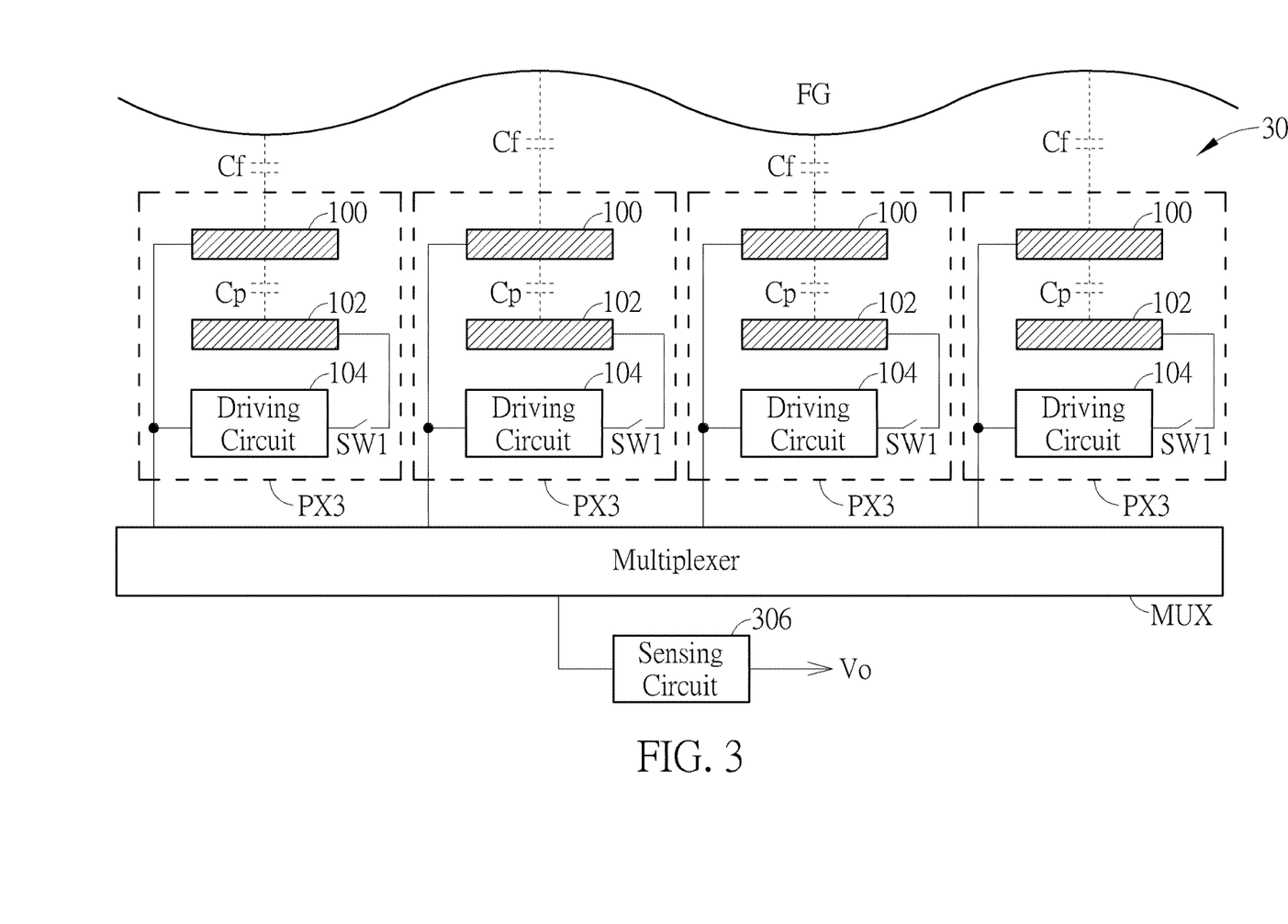
FIG. 3 is a schematic diagram of a fingerprint recognition system according to an embodiment of the present invention.
Figure 4:
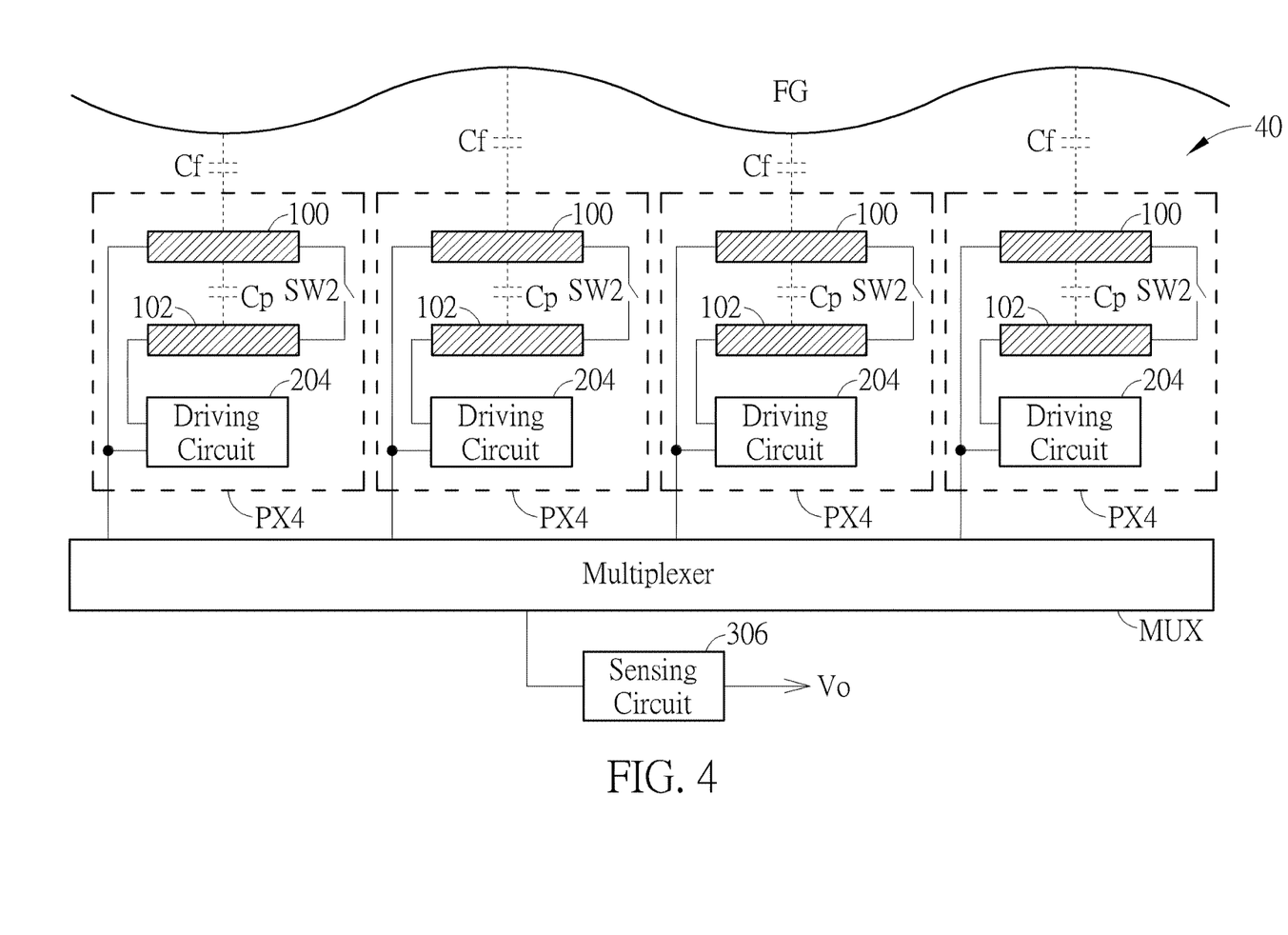
FIG. 4 is a schematic diagram of a fingerprint recognition system according to an embodiment of the present invention.

For example, please refer to FIG. 3 and FIG. 4, which are schematic diagrams of a fingerprint recognition system 30 and a fingerprint recognition system 40, respectively, according to embodiments of the present invention. The fingerprint recognition system 30 comprises a plurality of pixel circuits PX3, a multiplexer MUX and a sensing circuit 306, and the fingerprint recognition system 40 comprises a plurality of pixel circuits PX4, a multiplexer MUX and a sensing circuit 306. The pixel circuits PX3 and the pixel circuits PX4 are similar to the fingerprint recognition circuit 10 and the fingerprint recognition circuit 20, respectively, and thus, the same components are denoted by the same notations. The sensing circuit 306 is coupled to the touched layer 100 of the plurality of pixel circuits PX3 (or coupled to the touched layer 100 of the plurality of pixel circuits PX4) via the multiplexer MUX, to sense the touch capacitance Cf formed by the touched layer 100 of different pixel circuits PX3 within the plurality of pixel circuits PX3 at different time (or to sense the touch capacitance Cf formed by the touched layer 100 of different pixel circuits PX4 within the plurality of pixel circuits PX4 at different time). Details of the pixel circuits PX3 and PX4 may be referred to paragraphs in the above, which is not narrated herein for brevity. Both the fingerprint recognition system 30 and the fingerprint recognition system 40 are able to eliminate the effect on determining the capacitance of the touch capacitance Cf caused by the parasitic capacitance Cp, so as to enhance the accuracy of capacitance sensing and fingerprint recognition.

Figure 5:
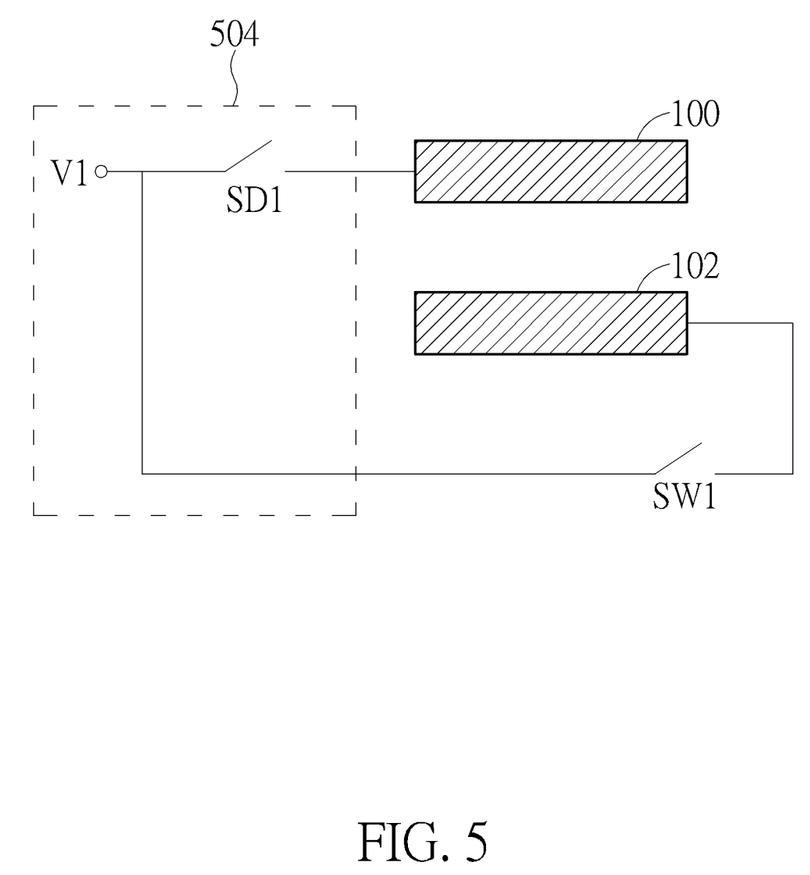
FIG. 5 is a schematic diagram of a driving circuit according to an embodiment of the present invention.
Figure 6:
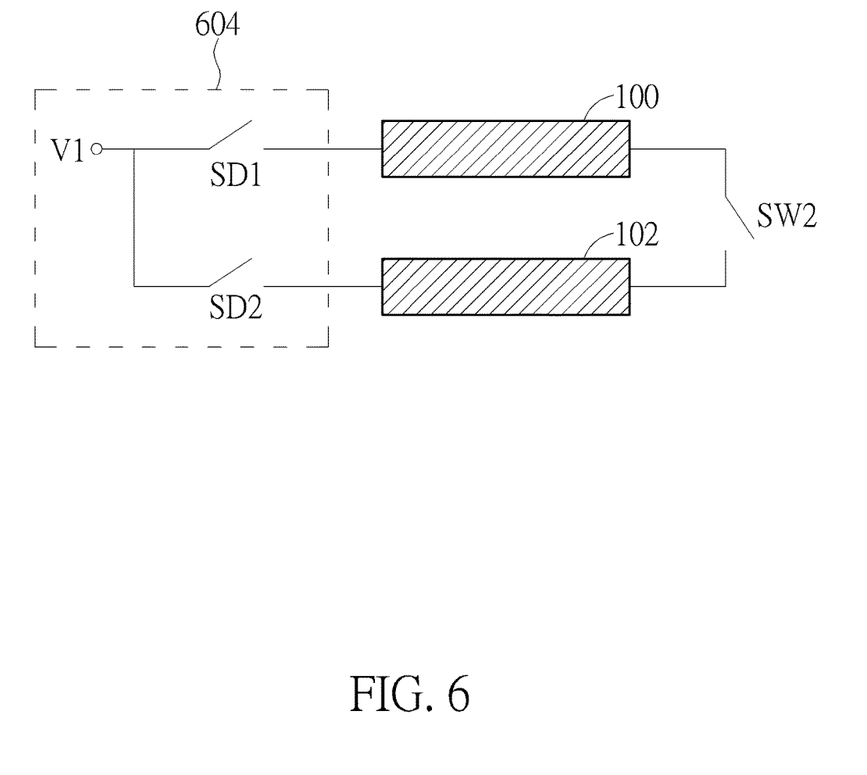
FIG. 6 is a schematic diagram of a driving circuit according to an embodiment of the present invention.
Figure 7:
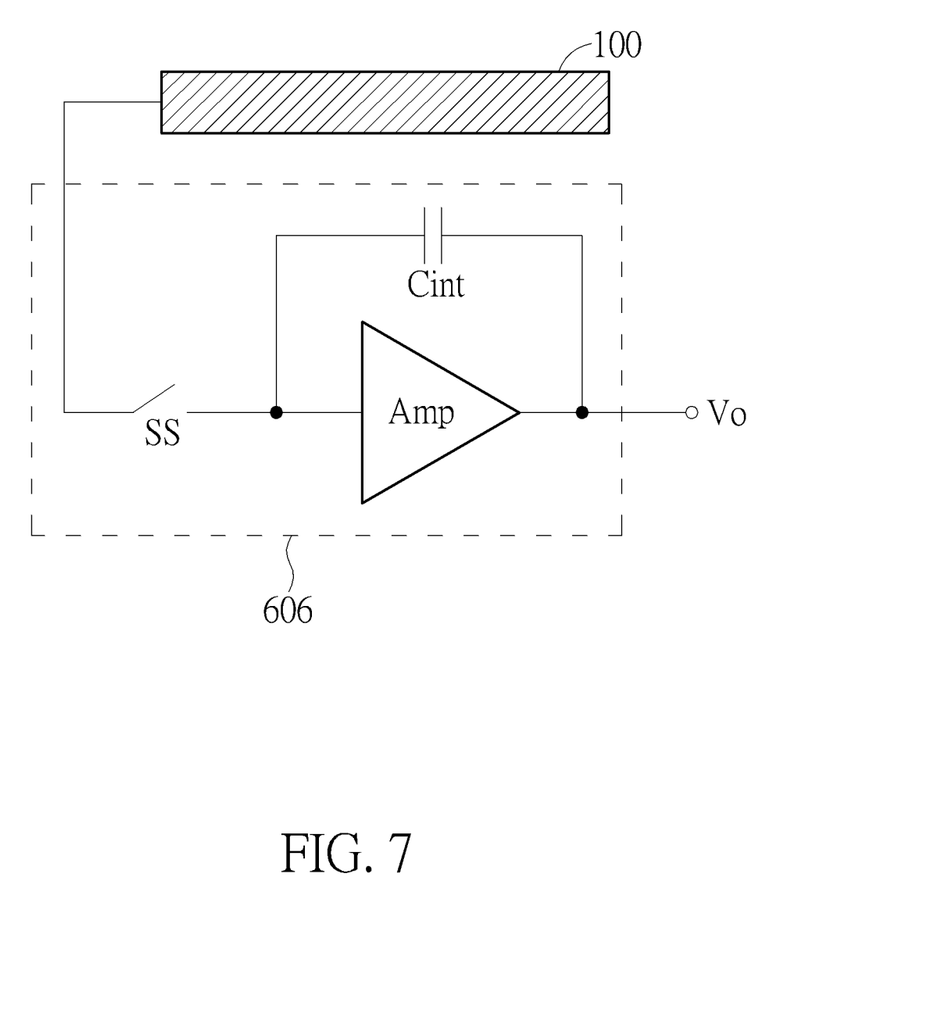
FIG. 7 is a schematic diagram of a sensing circuit according to an embodiment of the present invention.

In addition, the circuit structure of the driving circuit and the sensing circuit are known by the art, which is narrated below. Please refer to FIGS. 5-7. FIG. 5 and FIG. 6 are schematic diagrams of a driving circuit 504 and a driving circuit 604, respectively, according to embodiments of the present invention. FIG. 7 is a schematic diagram of a sensing circuit 706 according to an embodiment of the present invention. The driving circuit 504 may be configured to realize the driving circuit 104, which comprises a driving switch SD1, where the driving switch SD1 receives the first voltage V1. In the driving phase, the driving switch SD1 is conducted (ON), while in the sensing phase, the driving switch SD1 is cutoff (OFF). In addition, the driving circuit 604 may be configured to realize the driving circuit 204, which may comprise the driving switches SD1 and SD2. A terminal of the driving switch SD1 receives the first voltage V1, and another terminal is electrically connected to the touched layer 100. A terminal of the driving switch SD2 receives the first voltage V1, and another terminal is electrically connected to the shielding layer 102. In the driving phase, the driving switches SD1 and SD2 are conducted (ON), while in the sensing phase, the driving switches SD1 and SD2 are cutoff (OFF).

In addition, the sensing circuit 706 may be configured to realize the sensing circuit 106 or 306, which may comprise a sensing switch SS, an amplifier Amp and an integrating capacitor Cint. The integrating capacitor Cint is coupled between an input terminal and an output terminal of the amplifier Amp. The amplifier Amp and the integrating capacitor Cint form an integrator. The sensing switch SS is coupled between the input terminal of the amplifier Amp and the touched layer 100. In the driving phase, the sensing switch SS is cutoff, while in the sensing phase, the sensing switch SS is conducted and electronic charges within the touch capacitance Cf would flow to the integrating capacitor Cint and be stored in the integrating capacitor Cint. The integrator may generate the output voltage Vo accordingly and deliver the output voltage Vo to the backend circuit to sense the touch capacitance Cf, so as to determine the finger ridge or the finger valley of the finger FG.

In addition, the parasitic capacitance Cp would have impact on the feedback circuit of the integrator in general, such that the amplifier Amp would suffer more noise and performance of capacitance sensing and fingerprint recognition degrades. In comparison, the present invention may eliminate the effect of the parasitic capacitance Cp and reduce noise of the amplifier Amp, to enhance performance of capacitance sensing and fingerprint recognition.

Figure 8:
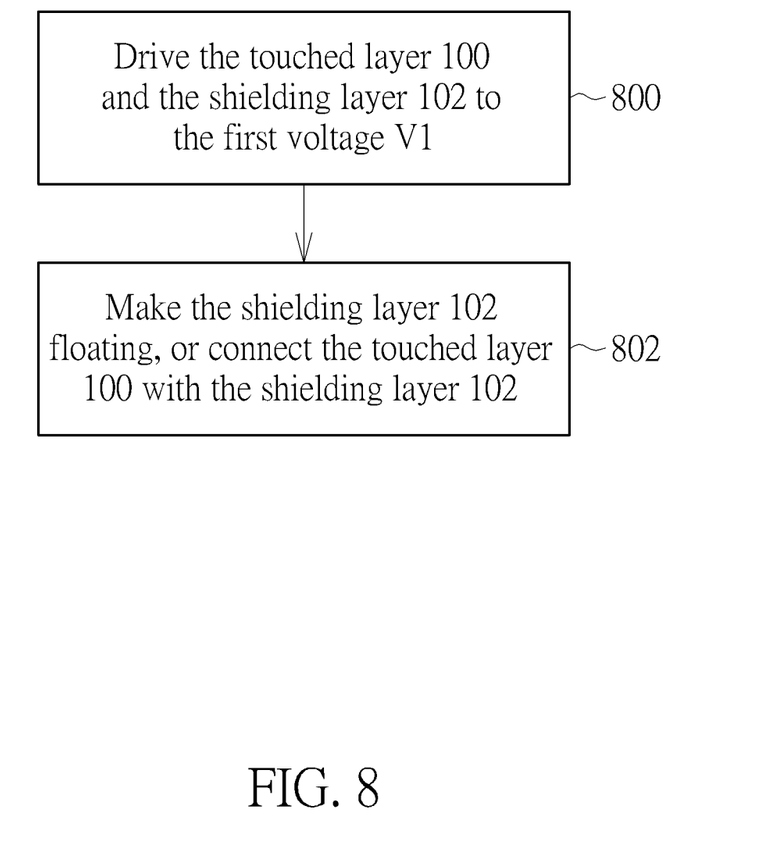
FIG. 8 is a schematic diagram of a parasitic capacitance cancelling process according to an embodiment of the present invention.

Operations of the capacitance determining circuit and the pixel circuits of the present invention may be further summarized as a parasitic capacitance cancelling process. Please refer to FIG. 8, which is a schematic diagram of a parasitic capacitance cancelling process 80 according to an embodiment of the present invention. The parasitic capacitance cancelling process 80 may be executed by the capacitance determining circuit 10 and 20 or the pixel circuits PX3 and PX4. As shown by FIG. 8, the parasitic capacitance cancelling process 80 comprises following steps:

Step 800: Drive the touched layer 100 and the shielding layer 102 to the first voltage V1.

Step 802: Make the shielding layer 102 floating, or connect the touched layer 100 with the shielding layer 102.

In the parasitic capacitance cancelling process 80, Step 800 represents operations of the capacitance determining circuits 10, 20 or the pixel circuits PX3, PX4 in the driving phase, and Step 802 represents operations of the capacitance determining circuits 10, 20 or the pixel circuits PX3, PX4 in the sensing phase. In Step 802, the capacitance determining circuit 10 or the pixel circuits PX3 utilize the cutoff switch SW1 to make the shielding layer 102 floating, while the capacitance determining circuit 20 or the pixel circuits PX4 utilize the conducted switch SW2 to make the touched layer 100 and the shielding layer 102 having the same voltage. Please refer to paragraphs in the above to see the rest details of the parasitic capacitance cancelling process 80, which is not narrated herein for brevity.

In summary, the present invention utilizes the switch connected between the shielding layer and the driving circuit to make the shielding layer floating in the sensing phase, or utilizes the switch connected between the shielding layer and the touched layer to make the shielding layer and the touched layer having the same voltage in the sensing phase, so as to eliminate the effect of the parasitic capacitance, such that the accuracy and performance of capacitance sensing and fingerprint recognition are enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitance determining circuit, characterized by, the capacitance determining circuit comprising:
    a touched layer, configured to receive a touch from a finger, wherein a touch capacitance is formed between the touched layer and the finger;
    a shielding layer, disposed under the touched layer, wherein a parasitic capacitance is formed between the shielding layer and the touched layer;
    a driving circuit, coupled to the touched layer and the shielding layer, configured to provide a first voltage to the touched layer and the shielding layer at a first time;
    a sensing circuit, electrically connected to the touched layer, configured to sense the touch capacitance at a second time; and
    a first switch, comprising
        a first terminal, electrically connected to the shielding layer; and
        a second terminal, electrically connected to the driving circuit or the touched layer;
    wherein when the second terminal of the first switch is electrically connected to the driving circuit, the first switch is cutoff at the second time, such that the shielding layer is floating at the second time;
    wherein when the second terminal of the first switch is electrically connected to the touched layer, the first switch is conducted at the second time.

2. The capacitance determining circuit as claim 1, characterized in that, the driving circuit comprises:
    a driving switch, configured to control the touched layer to receive the first voltage;
    wherein the driving switch is conducted at the first time.

3. The capacitance determining circuit as claim 1, characterized in that, the driving circuit comprises:
    two driving switches, configured to control the touched layer and the shielding layer, respectively, to receive the first voltage;
    wherein the two driving switches are conducted at the first time.

4. The capacitance determining circuit as claim 1, characterized in that, the sensing circuit comprises:
    an amplifier; and
    an integrating capacitor, coupled to an input terminal and an output terminal of the amplifier.

5. A fingerprint recognition system, characterized by, the fingerprint recognition system comprising:
    a sensing circuit;
    a plurality of pixel circuits, coupled to the sensing circuit, each pixel circuit comprising:
        a touched layer, configured to receive a touch from a finger, wherein a touch capacitance is formed between the touched layer and the finger;
        a shielding layer, disposed under the touched layer, wherein a parasitic capacitance is formed between the shielding layer and the touched layer;
        a driving circuit, electrically connected to the touched layer and the shielding layer, configured to provide a first voltage to the touched layer and the shielding layer at a first time; and
        a first switch, comprising
            a first terminal, electrically connected to the shielding layer; and
            a second terminal, electrically connected to the driving circuit or the touched layer;
        wherein the sensing circuit senses the touch capacitance of the plurality of pixel circuits at a second time;
    wherein when the second terminal of the first switch is electrically connected to the driving circuit, the first switch is cutoff at the second time such that the shielding layer is floating at the second time;
    wherein when the second terminal of the first switch is electrically connected to the touched layer, the first switch is conducted at the second time.

6. The fingerprint recognition system as claim 5, characterized in that, the driving circuit comprises:
    a driving switch, configured to control the touched layer to receive the first voltage;
    wherein the driving switch is conducted at the first time.

7. The fingerprint recognition system as claim 5, characterized in that, the driving circuit comprises:
    two driving switches, configured to control the touched layer and the shielding layer, respectively, to receive the first voltage;
    wherein the two driving switches are conducted at the first time.

8. The fingerprint recognition system as claim 5, characterized in that, the sensing circuit comprises:
    an amplifier; and
    an integrating capacitor, coupled to an input terminal and an output terminal of the amplifier.

9. The fingerprint recognition system as claim 5, characterized by further comprising:
    a multiplexer, coupled to the touched layers of the plurality of pixel circuits and the sensing circuit.

* * * * *